United States Patent [19]

Oshizawa et al.

[11] Patent Number: 5,414,630
[45] Date of Patent: May 9, 1995

[54] VEHICLE-MOUNTED NAVIGATION SYSTEM

[75] Inventors: Hidekazu Oshizawa, Cupertino, Calif.; Tatsuhiko Abe, Rochester, N.Y.

[73] Assignee: Zexel Corporation, Tokyo, Japan

[21] Appl. No.: 128,836

[22] Filed: Sep. 29, 1993

[51] Int. Cl.⁶ .............................................. G06F 15/50
[52] U.S. Cl. .................................. 364/449; 364/443; 340/990; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,774,672 | 9/1988 | Tsunoda et al. | 340/988 |
| 4,782,447 | 11/1988 | Ueno et al. | 340/995 |
| 4,937,570 | 6/1990 | Matsukawa et al. | 340/988 |
| 5,121,326 | 6/1992 | Moroto et al. | 364/449 |
| 5,323,321 | 6/1994 | Smith, Jr. | 364/444 |

*Primary Examiner*—Gary Chin
*Attorney, Agent, or Firm*—Thomas R. Morrison; George J. Brandt, Jr.

[57] ABSTRACT

A vehicle-mounted navigation system initially computes an optimal route from a starting point to a destination. A microcomputer computes the total distance the vehicle has travelled from a signal obtained from an axle sensor and computes the bearing of the vehicle (azimuth) from a signal obtained from a geomagnetic sensor. Then the microcomputer computes the present position of the vehicle from the starting point of the vehicle, its total distance travelled, and its bearing. The system then selects and displays one from among a plurality of arrows stored in a memory, each arrow representing a direction spaced a predetermined angle from an adjacent arrow, to guide the driver from the present position via the next intersection to the destination. This system also detects forked intersections, where two roads are close to the common direction represented by the arrow to be displayed. When a forked intersection is detected, the arrow displayed represents a direction spaced a predetermined angle, either clockwise or counterclockwise, from the common direction.

5 Claims, 5 Drawing Sheets

VEHICLE-MOUNTED NAVIGATION SYSTEM

BACKGROUND OF THE INVENTION

This invention relates to a vehicle-mounted navigation system. Recently, navigation systems have been proposed that compute an optimal route from a starting point to a destination and guide a vehicle to the destination along the optimal route.

In the navigation system disclosed in Japanese Laid-Open Patent Application No. Hei 1-210819, eight arrows stored in a memory represent eight different directions spaced 45° apart. The arrow representing the direction the driver should turn the vehicle to at the next intersection is selected and shown on a display. However, a problem arises where the driver encounters a forked intersection in the road. If the angle formed between two roads in the forked intersection is small, the navigation system disclosed in Japanese Laid-Open Patent Application No. Hei 1-210819 does not show the driver of the vehicle which of the two roads to choose.

OBJECTS AND SUMMARY OF THE INVENTION

It is an object of the present invention to provide a vehicle-mounted navigation system that overcomes the drawbacks of the prior art.

It is a further object of the present invention to provide a vehicle-mounted navigation system in which the direction of vehicular advance can be determined even when the angle separating two roads in a forked intersection is small.

It is a further object of the present invention to provide a vehicle-mounted navigation system in which the direction of vehicular advance is displayed in an easily understandable manner.

Briefly stated, a vehicle-mounted navigation system initially computes an optimal route from a starting point to a destination. A microcomputer computes the total distance the vehicle has travelled from a signal obtained from an axle sensor and computes the bearing of the vehicle (azimuth) from a signal obtained from a geomagnetic sensor. Then the microcomputer computes the present position of the vehicle from the starting point of the vehicle, its total distance travelled, and its bearing. The system then selects and displays one from among a plurality of arrows stored in a memory, each arrow representing a direction spaced a predetermined angle from an adjacent arrow, to guide the driver from the present position via the next intersection to the destination. This system also detects forked intersections, where two roads are close to the common direction represented by the arrow to be displayed. When a forked intersection is detected, the arrow displayed represents a direction spaced a predetermined angle, either clockwise or counterclockwise, from the common direction.

According to an embodiment of the invention, a navigation system comprises: means for computing an optimal route from a starting point to a destination from map information stored in a map information storage medium, the optimal route including intersections; means for detecting a present position of a vehicle; means for detecting, from present position information obtained by the means for detecting, a next intersection the vehicle will encounter on the optimal route; a plurality of direction indication images indicating a plurality of particular directions spaced a predetermined angle apart, an integer multiple of the predetermined angle being 360°; memory means for storing the plurality of direction indication images; means for deciding whether the next intersection is a special intersection wherein a plurality of roads meet; the special intersection having a first road and a second road connected thereto, the first and the second roads being arranged in a left and right relation to one another when viewed at the special intersection, the directions of the first and the second roads being substantially indistinguishable from a common particular direction among the plurality of particular directions; first means for selecting, when a result from the means for deciding indicates no special intersection, a one of the plurality of direction indication images stored in the memory means that indicates a one of the plurality of particular directions closest to the direction in which the vehicle should advance at the next intersection; second means for selecting, when the means for deciding indicates a special intersection and when the first road is to be taken, a one of the plurality of direction indication images indicating a one of the particular directions displaced clockwise by the predetermined angle from the common particular direction; third means for selecting, when the means for deciding indicates a special intersection and when the second road is to be taken, a one of the plurality of direction indication images indicating a one of the particular directions displaced counterclockwise by the predetermined angle from the common particular direction; and means for displaying the one of the plurality of direction indication images.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
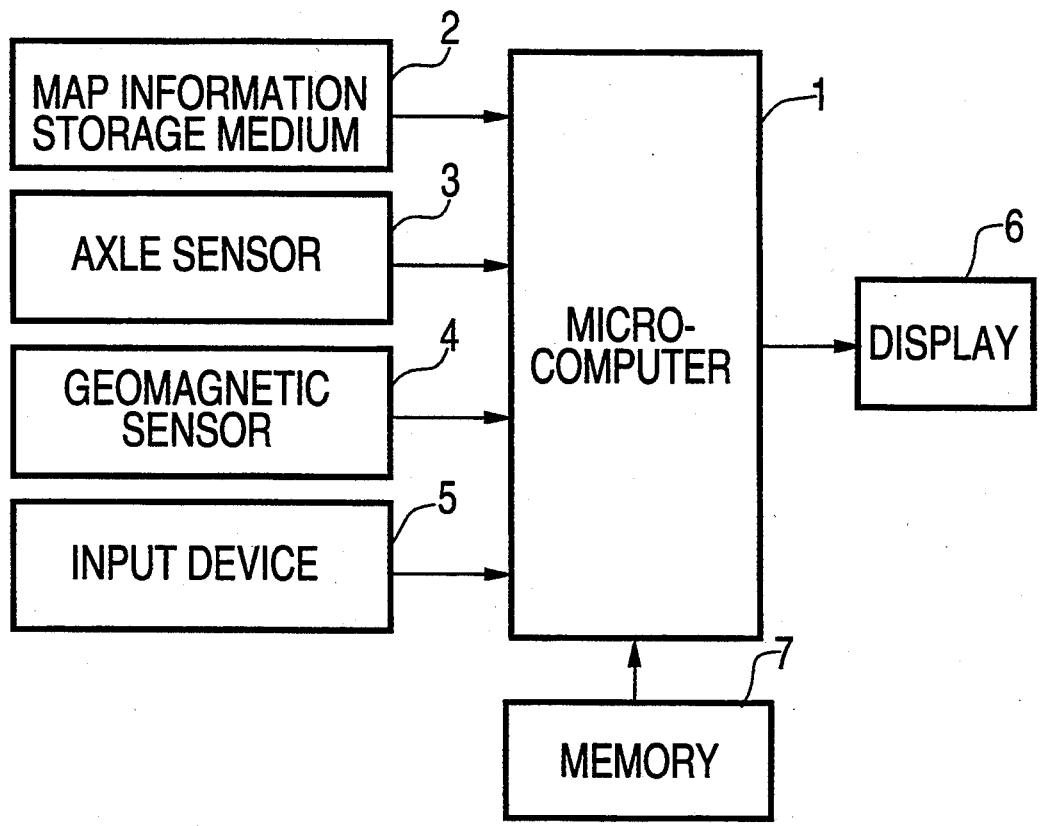
FIG. 1 is a block diagram of a navigation system according to an embodiment of the present invention.

Referring to FIG. 1, in a vehicle-mounted navigation system of the present invention, a microcomputer 1 receives from an axle sensor 3 pulses equal in number to the number of revolutions made by an axle of the vehicle. Microcomputer 1 also receives from a geomagnetic sensor 4 a signal indicating the direction of vehicular advance. Microcomputer 1 computes a present position of the vehicle from these pulses and signals. Microcomputer 1 may also compute a present position of the vehicle from GPS (Global Positioning System) using three or four artificial satellites. A map information storage medium 2 (e.g., a CD-ROM or an IC card) contains map information, including intersections and a road network. From an input device 5, a driver enters a starting point and a destination into microcomputer 1. Microcomputer 1 can send vehicle guidance information to a display 6 for displaying that information. A memory 7 stores arrows A–H.

Figure 2:
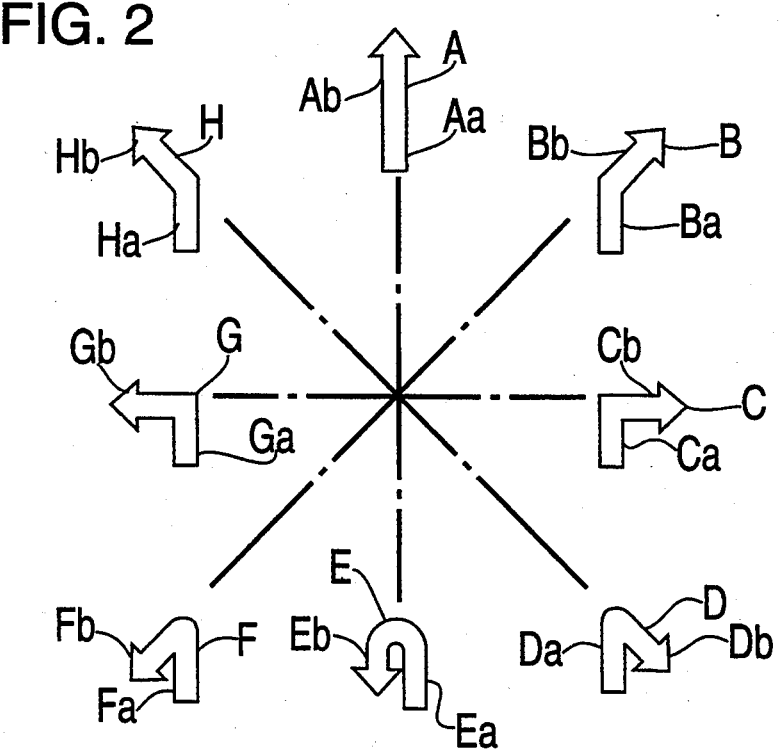
FIG. 2 is a view of eight arrows displayed on a display unit.
Figure 4:
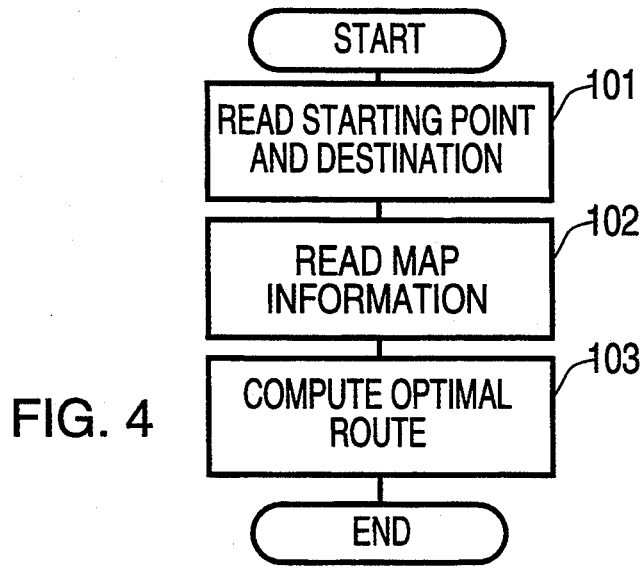
FIG. 4 is a flow chart of a routine executed by the microcomputer of FIG. 1 for computing an optimal route.

Referring to FIGS. 1, 2, and 4, a navigation routine executed by microcomputer 1 draws on map information from map information storage medium 2 to compute an optimal route from the starting point to the destination entered through input device 5. The navigation routine starts when either the ignition key switch of the vehicle or its navigation start switch is turned ON. In Step 101, a starting point and a destination are read from input device 5. In Step 102, map information is read from map information storage medium 2. In Step 103, the optimal route from the starting point to the destination is computed from the map information to minimize either the distance from the starting point to the destination or the time needed to travel that distance. Microcomputer 1 selects from memory 7 one of arrows A–H to represent the direction the vehicle should take at a next intersection and directs the display of this arrow on display 6. If the next intersection is a standard intersection, microcomputer 1 selects the arrow whose distal portion has an angle corresponding to the direction that the vehicle should take.

Referring to FIG. 2, arrows A–H have proximal portions Aa–Ha, respectively, to represent the road along which the vehicle is presently travelling; and distal portions Ab–Hb, respectively, to represent the direction the driver should take at the next intersection. Distal portions Ab–Hb are spaced apart by 45°. These congruent angular spacings are determined by dividing 360° into eight equal portions. For example, distal portion Ab of arrow A indicates the current direction of the vehicle, while distal portion Bb of arrow B indicates the direction 45° clockwise therefrom.

Figure 3A:
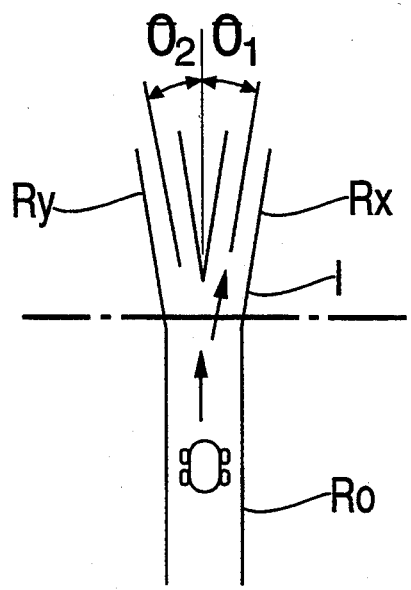
FIG. 3A is a schematic view of actual roads at an intersection.

Referring to FIG. 3A, in the conventional navigation system, if next intersection I is a forked intersection, arrow A is displayed regardless of whether the vehicle should enter road $R_x$ or road $R_y$, and the driver is confused about which road to enter.

Figure 3B:
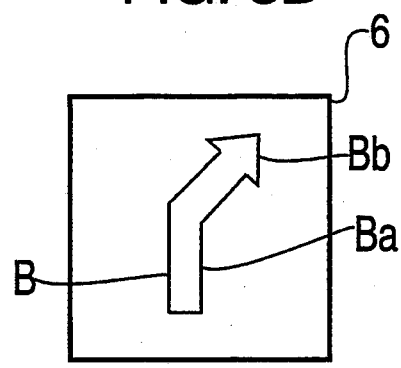
FIG. 3B is a view of the arrow displayed when a vehicle should enter road $R_x$ of FIG. 3A.
Figure 3C:
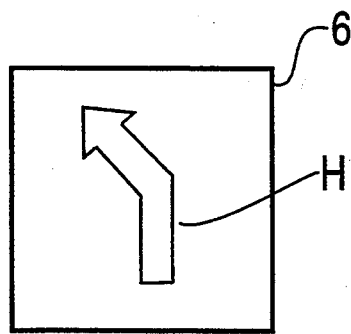
FIG. 3C is a view of the arrow displayed when a vehicle should enter road $R_y$ of FIG. 3A.

Referring to FIGS. 3B and 3C, the navigation system of the present invention employs a special arrow selection method if next intersection I is a forked intersection. When the vehicle should enter road $R_x$, microcomputer 1 selects arrow B from arrows A–H stored in memory 7 and sends it to display 6. When the vehicle should enter road $R_y$, microcomputer 1 selects and displays arrow H. Thus the road the vehicle should enter at the forked intersection is indicated by either arrow H or arrow B, which respectively represent the directions 45° counterclockwise and clockwise from the direction represented by arrow A. The driver can choose, quickly and without hesitation, between roads $R_x$ and $R_y$.

Figure 5:
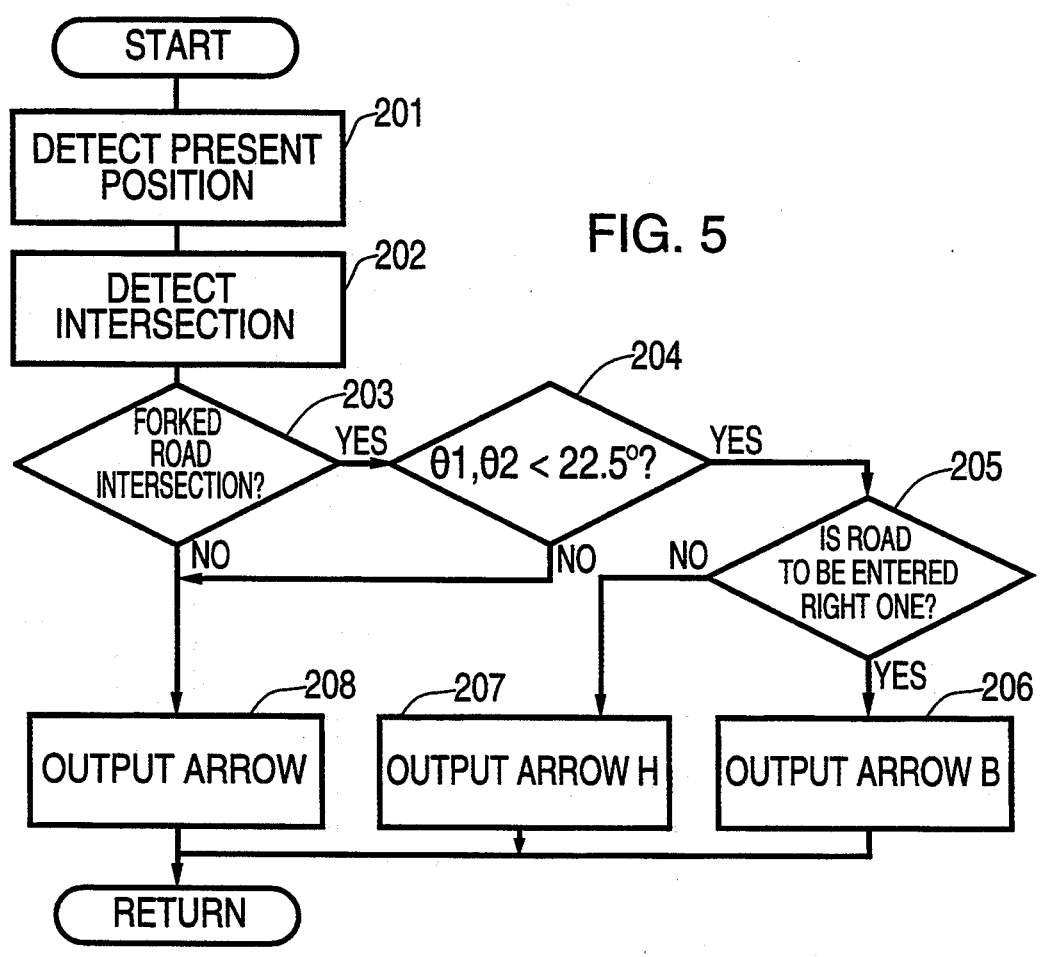
FIG. 5 is a flowchart of a timer interrupt routine executed by the microcomputer of FIG. 1.

Referring to FIGS. 3A and 5, microcomputer 1 executes the timer interrupt routine of FIG. 5 at predetermined intervals. Step 201 determines the present position of the vehicle. Step 202 determines the next intersection from the optimal route information and the present position information. In Step 203 microcomputer I decides whether this intersection is a forked intersection. If "YES", Step 204 determines whether angles $\Theta_1$ and $\Theta_2$ are each less than 22.5°. In other words, Step 204 decides whether arrow A would be chosen to represent both roads in the forked intersection. If the result of Step 204 is "YES", Step 205 determines whether the vehicle should enter road $R_x$ or road $R_y$. If Step 205 decides that road $R_x$ should be chosen, Step 206 causes arrow B to be selected and displayed. If Step 205 decides that road $R_y$ should be chosen, Step 206 causes arrow H to be selected and displayed. If the results of Steps 203 and 204 are "NO", Step 208 causes to be selected and displayed the arrow that represents the direction closest to that which the vehicle should take. After any one of Steps 206 through 208 is executed, this routine ends.

Figure 3D:
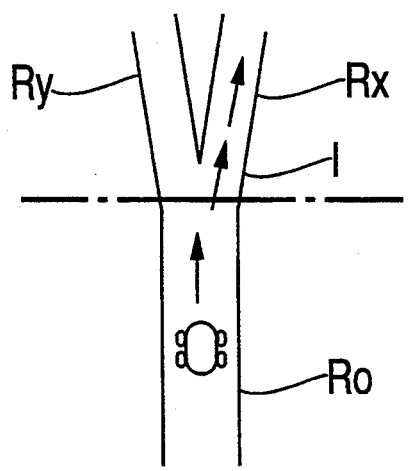
FIG. 3D is another schematic view of actual roads at an intersection.
Figure 6:
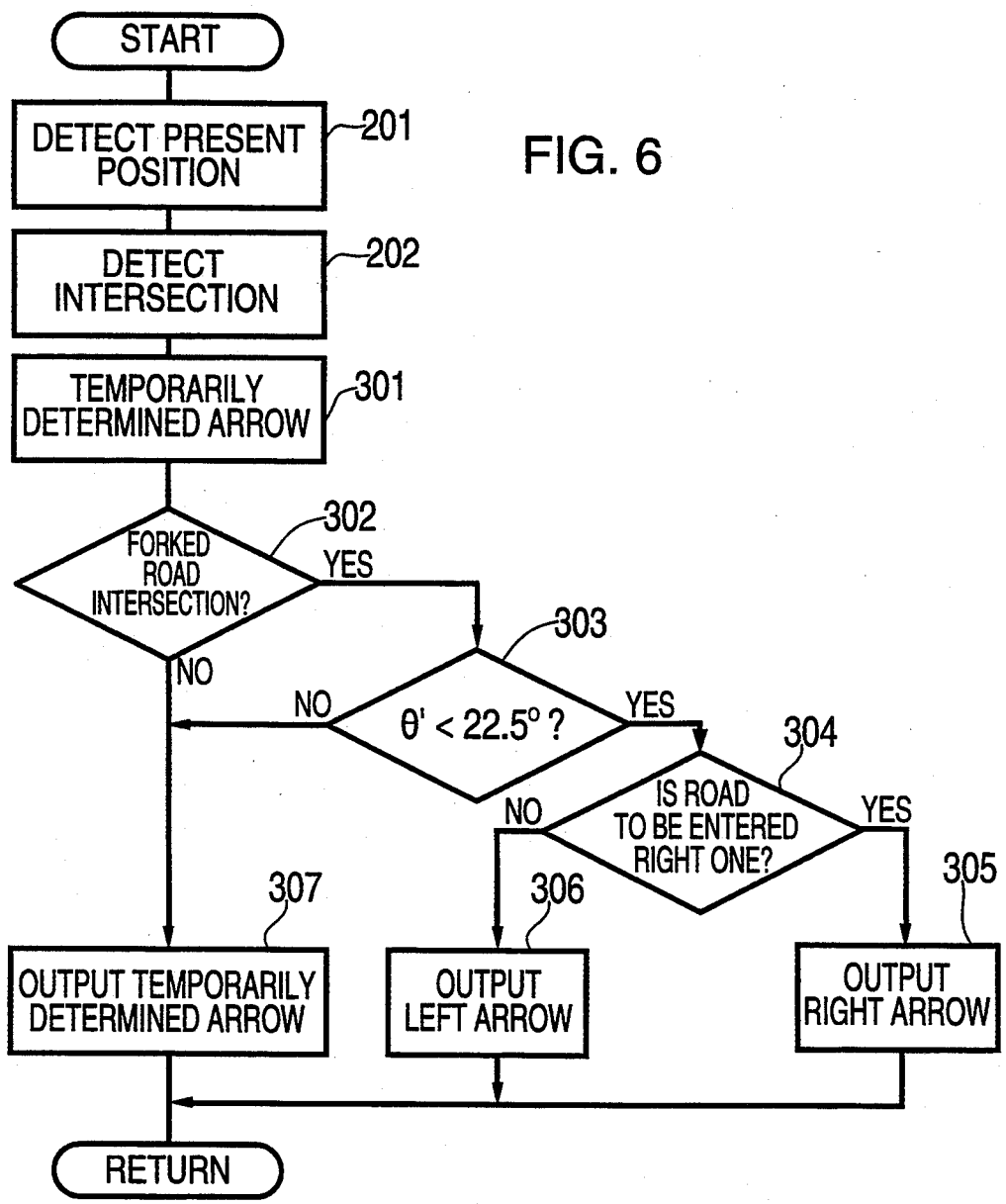
FIG. 6 is a flow chart of a modified timer interrupt routine executed by the microcomputer of FIG. 1.

Referring to FIGS. 3D and 6, in a second embodiment of the present invention, microcomputer 1 executes the timer interrupt routine of FIG. 6 at predetermined intervals. After the next intersection is detected in Step 202, the program proceeds to Step 301, where the arrow indicating the direction the vehicle should take is selected from memory 7 as a temporarily-determined arrow. Step 302 then determines whether the intersection is a forked intersection. If Step 302 identifies a forked intersection, the program proceeds to Step 303, where the direction represented by the temporarily-determined arrow becomes a reference axis, and a determination is made whether an angle $\Theta'$ between this reference axis and an axis along the road the vehicle should not enter is less than 22.5°. If the result is "YES", Step 304 determines whether the road to enter is $R_x$ or $R_y$. If Step 304 determines that the correct road is $R_x$, Step 305 outputs the arrow whose distal portion is spaced 45° clockwise from the distal portion of the temporarily-determined arrow, that is, an arrow 45° to the right of the temporarily-determined arrow. If Step 304 determines that the correct road is $R_y$, Step 306 sends to display 6 the arrow whose distal portion is spaced 45° counterclockwise from the distal portion of the temporarily-determined arrow, that is, an arrow 45° to the left of the temporarily-determined arrow. If the result in either Step 302 or Step 303 is "NO", Step 307 outputs the temporarily-determined arrow.

Figure 7A:
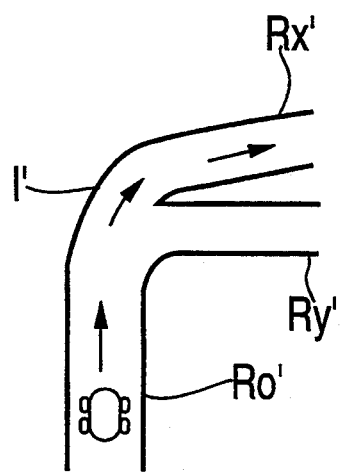
FIG. 7A is a schematic view of actual roads at an intersection.
Figure 7B:
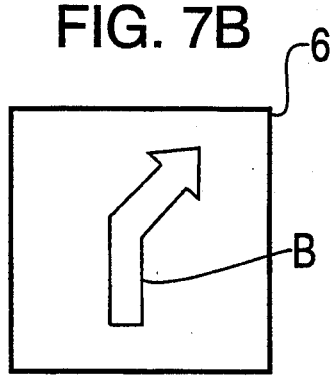
FIG. 7B is a view of an arrow displayed when a vehicle should enter road $R_x'$ of FIG. 7A.
Figure 7C:
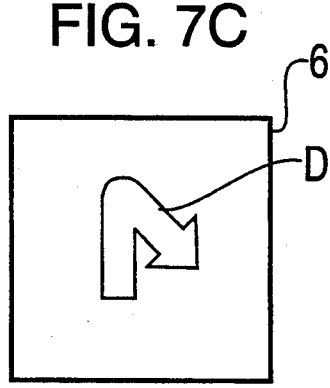
FIG. 7C is a view of an arrow displayed when a vehicle should enter road $R_y'$ of FIG. 7A.

Referring to FIGS. 7A, 7B, and 7C, two roads $R_x'$ and $R_y'$ constituting the forked intersection can be located near any of the directions represented by arrows A–H. For example, assume the vehicle travels along a road $R_o'$ before encountering a forked intersection I'. If the vehicle should enter $R_x'$, arrow B, spaced 45° counterclockwise from arrow C, is selected and displayed. If the vehicle should enter road $R_y'$, arrow D, displaced 45° clockwise from arrow C, is selected and displayed.

A third embodiment of the present invention employs sixteen arrows to represent sixteen directions spaced 22.5° apart.

In a fourth embodiment of the present invention, at least three roads connect to the road along which the vehicle travels. Both the road to be entered and another road are close to a direction represented by one arrow. For example, referring to FIG. 3A, the arrows of FIGS. 3B and 3C are likewise applicable where the vehicle should enter either road $R_x$ or road $R_y$ at an intersection where there are two other roads extending in the directions indicated by the two dotted-chain lines.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A navigation system, comprising:
   means for computing an optimal route from a starting point to a destination from map information stored in a map information storage medium, said optimal route including intersections;
   means for detecting a present position of a vehicle;
   means for detecting, from present position information obtained by said means for detecting, a next intersection said vehicle will encounter on said optimal route;
   a plurality of direction indication images indicating a plurality of particular directions spaced a predetermined angle apart, an integer multiple of said predetermined angle being 360°;
   memory means for storing said plurality of direction indication images;
   means for deciding whether said next intersection is a special intersection wherein a plurality of roads meet;
   said special intersection having a first road and a second road connected thereto, said first and said second roads being arranged in a left and right relation to one another when viewed at said special intersection, the directions of said first and said second roads being substantially indistinguishable from a common particular direction among said plurality of particular directions;
   first means for selecting, when a result from said means for deciding indicates no said special intersection, one of said plurality of direction indication images stored in said memory means indicating one of said plurality of particular directions that is closest to the direction in which said vehicle should advance at said next intersection;
   second means for selecting, when said means for deciding indicates said special intersection when said first road is to be taken, one of said plurality of direction indication images indicating one of said particular directions displaced clockwise by said predetermined angle from said common particular direction;
   third means for selecting, when said means for deciding indicates said special intersection when said second road is to be taken, one of said plurality of direction indication images indicating one of said particular directions displaced counterclockwise by said predetermined angle from said common particular direction; and
   means for displaying said selected one of said plurality of direction indication images.

2. A navigation system according to claim 1, wherein: said predetermined angle is 45°.

3. A navigation system according to claim 1, wherein: said predetermined angle is 22.5°.

4. A navigation system according to claim 1, wherein: said means for deciding is effective for identifying said special intersection that has connected thereto only said first and said second roads.

5. A navigation system according to claim 1, wherein: said means for deciding is effective for identifying said special intersection where said common particular direction is an extension of the road along which said vehicle is travelling.

* * * * *